Feb. 12, 1952

D. E. WIEGAND 2,585,065

COMBINED MAGNETIC TRANSDUCER HEAD AND COUPLING TRANSFORMER

Filed Dec. 24, 1947

2 SHEETS—SHEET 1

Inventor
DAVID E. WIEGAND.

by The Firm of Charles W. Hills Attys.

Inventor
DAVID E. WIEGAND.

by The Firm of Charles W. Hills Attys.

Patented Feb. 12, 1952 2,585,065

UNITED STATES PATENT OFFICE 2,585,065

COMBINED MAGNETIC TRANSDUCER HEAD AND COUPLING TRANSFORMER

David E. Wiegand, Villa Park, Ill., assignor to Armour Research Foundation of Illinois Institute of Technology, Chicago, Ill., a corporation of Illinois Application December 24, 1947, Serial No. 793,727

6 Claims. (Cl. 179—100.2)

This invention relates to an electromagnetic transducer head, and more particularly, to what is generally known as a single-turn head with the turn going through the gap of the head.

Great improvements have been made in the magnetic recording field in recent years, and to some extent this has been brought about by the development of relatively high coercive force materials which could be formed into a wire or tape for use as a magnetic record member. It has been found that the maximum capabilities of high coercive force material can only be utilized when certain conditions are present. In the recording process, intense magnetic fields are required, and these intense fields are obtained by the present invention with a minimum amount of leakage flux which tends to demagnetize the high frequency. In other words, the effective scanning width of the recording gap is reduced, thus allowing the recording of higher frequencies.

A further feature of the present invention is the ability of heads designed in accordance with the teachings of the present invention to erase high coercive force material without overheating of the head structure. In general, intense magnetic fields in electromagnetic apparatus are obtained only by operating the electrical part of the apparatus at high current density. In the head structures of the present invention, the copper foil in the gap may be operated at extremely high current density because of its short length and because of rapid heat conduction to relatively heavy masses of copper to which the foil is attached at both ends. In this connection, the present invention is particularly advantageous in that the high current density is applied where it is needed the most, or, in other words, in the head gap close to the recording wire.

The head structures of the present invention are also particularly advantageous as play-back heads. In conventional play-back heads of the prior art, a compromise has been made in selecting the width of the head gap. As the width of the gap is decreased, the fineness of scanning is improved, but the leakage flux across the gap surfaces directly under the record member increases. Since this leakage flux does not thread the coil, a reduction in output voltage results. This effect is present for all frequencies. At high frequencies, there is an additional effect in prior art head structures. When the head coil is loaded by a resistor, such as is commonly used in the input circuit of a play-back amplifier, or by the distributed capacitance of the coil itself in associated wiring, the resulting currents in the coil cause an increase in leakage flux. The effect is the same for a head without this additional leakage flux in series with an inductance. In the case of the resistance loading, the effect is a gradual falling off of the high frequencies. The effect of the capacitance loading is to cause a resonant frequency beyond which the response of the head is extremely poor or nil. As a result of these series inductance effects, there is a limit to the number of turns that can be placed on a conventional pick-up head and, therefore, a limit on the voltage which can be supplied by the head.

With a structure such as that of the present invention, part of the flux leaking across the gap and all of the flux leaking below the gap links the turn in the gap, and therefore, is just as effective in producing voltage as the flux which follows the path of the core structure. The result is an increase in output voltage in medium and low frequencies, and also at high frequencies, since the effect of the apparent series inductance of the head is greatly reduced.

It is an object of the present invention to provide a novel electromagnetic transducer head which is efficient in operation, and rugged and reliable in use.

A further object of the present invention is to provide a novel electromagnetic transducer head which is particularly suited for use with relatively high coercive force materials, such, for example, as materials having a coercive force in excess of 300 oersteds.

A still further object of the present invention is to provide a novel single-turn electromagnetic transducer head.

Another and further object of the present invention is to provide a novel combination electromagnetic transducer head and transformer.

Still another and further object of the present invention is to provide a novel head which is suitable for use either as a recording head, a play-back head or an erase head.

The novel features which I believe to be characteristic of my invention are set forth with particularity in the appended claims. My invention itself, however, both as to its organization, manner of construction, and method of operation, together with further objects and advantages thereof, may best be understood by reference to the following description taken in connection with the accompanying drawings, in which:

Figure 1:
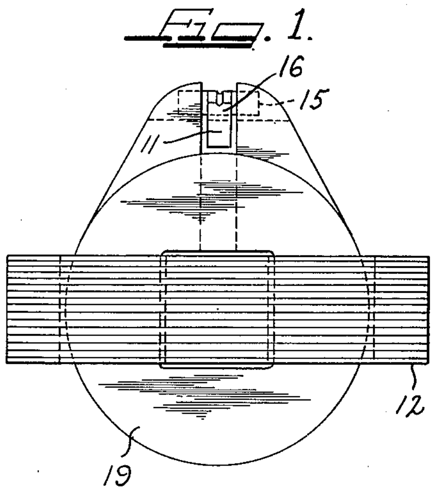
Figure 1 is a front elevational view of an electromagnetic transducer head embodying the novel teachings and characteristics of the present invention.
Figure 2:
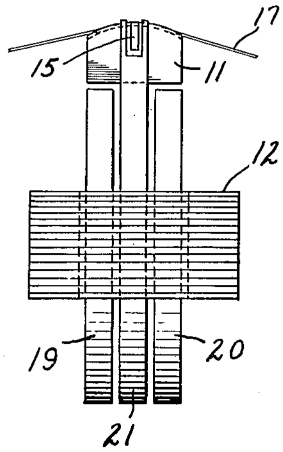
Figure 2 is a right end view of the electromagnetic transducer head shown in Figure 1.
Figure 3:
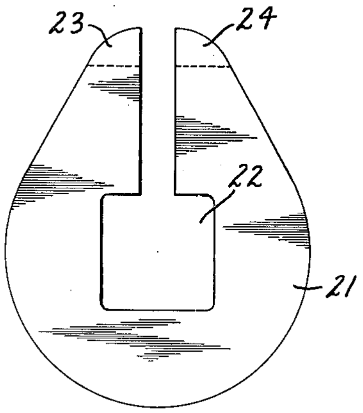
Figure 3 is a front elevational view of a slotted copper plate employed in the structure shown in Figure 1.
Figure 4:
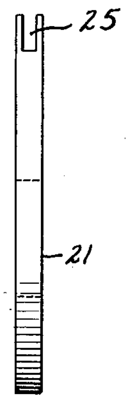
Figure 4 is an end view of the copper plate shown in Figure 3.
Figure 5:
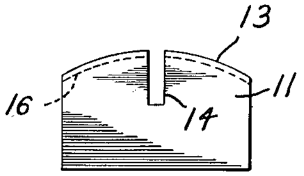
Figure 5 is a view of the head lamination employed in the head structure shown in Figure 1.
Figure 6:
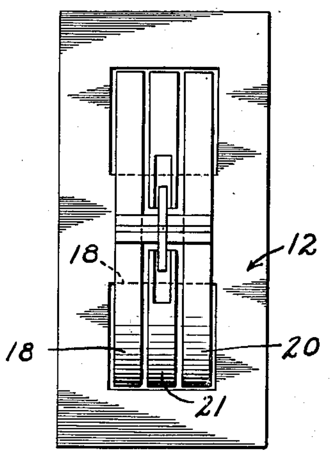
Figure 6 is a top view of the electromagnetic transducer head shown in Figure 1.

Referring first to the form of the invention illustrated in Figures 1 to 6 of the drawings, the electromagnetic transducer head illustrated includes a head lamination 11 and a transformer core 12, each made of magnetic material having relatively high permeability and relatively low retentivity. The head lamination 11 as shown in Figure 5 of the drawings has an arcuate top edge 13 which is slotted as at 14 to receive a copper foil or bar 15 which extends at right angles to the plane of the face of the core lamination 11. The top edge 13 is also grooved as at 16 to receive a wire or other thread-like magnetic record member 17 (shown only in Figure 2). The core 11, of course, acts as a low magnetic reluctance path for the magnetic field about the current-carrying copper bar or foil 15 and tends to concentrate the magnetic field in the small gap 14 across which the wire or other magnetic record member 17 crosses.

The transformer core 12 may be of any suitable form, but preferably is a laminated simple rectangular shell type core having a center leg 18 upon which two pancake coils 19 and 20 are mounted. These pancake coils 19 and 20 lie on opposite sides of a copper plate 21 which in the illustrated embodiment of the present invention has the shape as illustrated most clearly in Figures 3 and 4 of the drawings. This plate 21 has a central opening 22 which enables the plate to straddle the leg 18 of the transformer core 12. The plate 21 also includes two upstanding leg portions 23 and 24 which straddle the head lamination 11 as is clearly shown in Figure 1 of the drawings.

The tops of the legs 23 and 24 are slotted as at 25 to receive the copper foil or bar 15, the bar 15 being secured to the legs 23 and 24 by solder or other suitable bonding and electrically conducting material. The copper plate 21 thus, in conjunction with the copper foil or bar 15 acts as a single-turn coil for feeding energy to or from the head lamination 11. For example, when the electromagnetic transducer head is being used to make a magnetic record on the traveling record member 17, fluctuating electric energy representing the signal to be recorded is fed to the pancake coils 19 and 20, these coils being the primary windings of the coupling transformer which feeds energy to the head lamination 11. Fluctuating electric current is thus induced in the single-turn secondary formed by the copper plate 21 and the copper bar 15. The fluctuating electric current is of high current density, thus enabling good recording on high coercive force material used as the record member 17.

The fluctuating electric current flowing through the bar 15 sets up a strong fluctuating magnetic field around the bar 15. This causes longitudinal magnetization of the traveling record member 17 as it passes across the gap 14 in the head lamination 11. On play-back, the reverse operation takes place. This same type of head may also be used as an erase head, and very satisfactory results are obtained in erasing high coercive force material.

Figure 7:
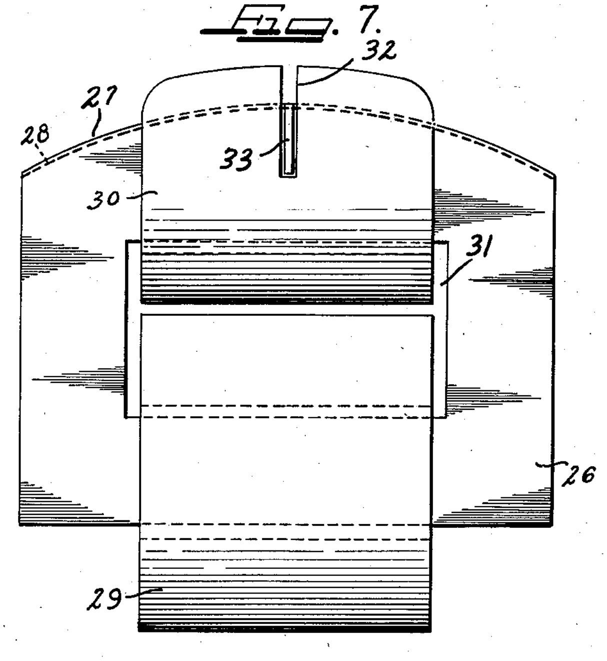
Figure 7 is a front elevational view of a different embodiment of the present invention.
Figure 8:
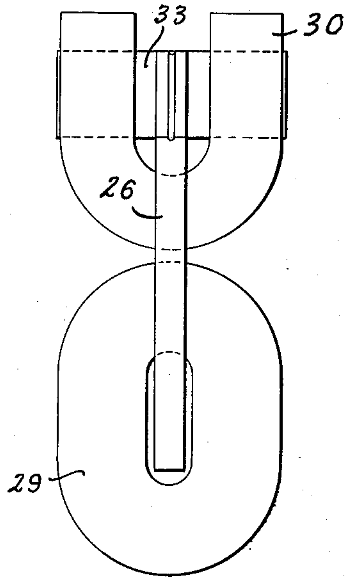
Figure 8 is a right end view of the embodiment of the invention shown in Figure 7.
Figure 9:
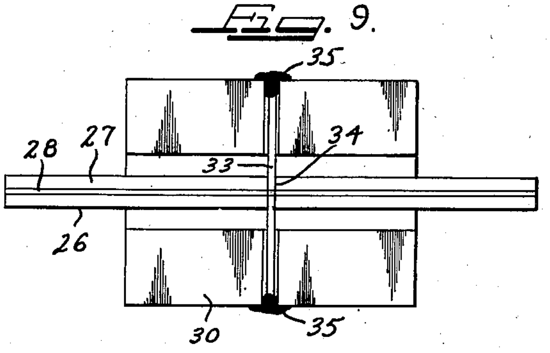
Figure 9 is a top view of the electromagnetic transducer head shown in Figure 7.

In the form of the invention shown in Figures 7, 8 and 9 of the drawings, the head lamination and the transformer core are combined in a single structure 26 which is in the form of a single lamination having an arcuate top edge 27 grooved as at 28 to receive the traveling record member.

The single lamination 26 is a simple rectangular, core type core piece and has the high impedance winding 29 mounted on the lower part thereof. A U-shape strap 30 also extends through the rectangular opening 31 in the core 26 and straddles the upper portion of the core 26. This U-shape copper strap 30 is slotted as at 32 to receive a bar or copper foil 33 which extends through the slot 34 formed in the top edge 27 of the lamination 26. The bar 33 is soldered or otherwise suitably electrically secured to the strap 30 as at 35. The strap 30, in conjunction with the bar 33, thus forms a single-turn winding for the transformer which enables the use of high current density in the bar 33.

This second embodiment of the present invention is not quite as effective from the standpoint of low leakage reactance as the first form of the invention, since the single-turn is not as closely linked to the high impedance coil, but it has the advantage that the parts of the copper strap 30 which lie parallel to the side surfaces of the head lamination act as eddy current shields and, therefore, serve to concentrate the flux in the record member.

While I have shown several particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A combined electromagnetic transducer head and transformer comprising a single core having an edge thereof slotted to provide a pair of confronting poles over which a traveling magnetic record member is arranged to pass, a relatively high impedance winding on said core, and a relatively low impedance winding on said core, a portion of said low impedance winding lying in said slot and additional portions of said low impedance winding lying along either side of said poles thereby providing eddy current shields which concentrate the flux in the record member.

2. A combined electromagnetic transducer head and transformer comprising a single core having an edge thereof slotted to provide a pair of confronting poles over which a traveling magnetic record member is arranged to pass, a relatively high impedance winding on said core, and a single turn winding in the form of a closed loop about said core, said single turn winding including an elongated conductor lying in said slot and a C-shape strap having the ends thereof secured to said conductor.

3. A combined electromagnetic transducer head and transformer comprising a core of magnetic material having a central opening therein and having an edge thereof slotted to provide a pair of confronting poles over which a traveling magnetic record member is arranged to pass, a relatively high impedance winding wound on said core at a point remote from said slot, a bar of conducting material seated in said slot and extending out of either side thereof, and a conducting strap extending through said opening in said core and up on both sides thereof in the region of said slot, said strap being electrically connected and secured to said bar.

4. A combined electromagnetic transducer head and transformer comprising a core of magnetic material having a central opening therein and having an edge thereof slotted to provide a pair of confronting poles over which a traveling magnetic record member is arranged to pass, a relatively high impedance winding wound on said core at a point remote from said slot, a bar of conducting material seated in said slot and extending out of either side thereof, and a conducting strap extending through said opening in said core and up on both sides thereof in the region of said slot, said strap being electrically connected and secured to said bar, said strap being substantially as wide as the width of said opening in said core.

5. A combined electromagnetic transducer head and transformer comprising a core of magnetic material having a central opening therein and having an edge thereof slotted to provide a pair of confronting poles over which a traveling magnetic record member is arranged to pass, a relatively high impedance winding wound on said core at a point remote from said slot, a bar of conducting material seated in said slot and extending out of either side thereof, and a conducting strap extending through said opening in said core and up on both sides thereof in the region of said slot, said strap being electrically connected and secured to said bar, the ends of said strap extending beyond the edge over which the travelling record member passes.

6. A combined electromagnetic transducer head and transformer comprising a single core having a transformer core portion and a transducer head core portion, said transducer head portion including a pair of spaced poles with a non-magnetic gap therebetween, means establishing a magnetic path between said core portions, a relatively high impedance winding on said transformer core portion, a metal bar extending within said gap, and means including a single turn, electrically conductive member about said transformer core portion secured to said bar and magnetically coupled to said high impedance winding, said last named means providing a low impedance path for concentrating the magnetic field in the vicinity of said gap.

DAVID E. WIEGAND.

REFERENCES CITED

The following references are of record in the file of this patent:

UNITED STATES PATENTS

| Number | Name | Date |
|---|---|---|
| 2,418,542 | Camras | Apr. 8, 1947 |
| 2,456,767 | Camras | Dec. 21, 1948 |
| 2,539,400 | Camras | Jan. 30, 1951 |

FOREIGN PATENTS

| Number | Country | Date |
|---|---|---|
| 612,450 | Germany | Apr. 25, 1935 |
| 622,623 | Germany | Dec. 2, 1935 |
| 693,664 | Germany | July 16, 1940 |
| 880,550 | France | Mar. 29, 1943 |